United States Patent
Fu et al.

(10) Patent No.: US 8,411,350 B2
(45) Date of Patent: Apr. 2, 2013

(54) OPTICAL DEMODULATOR

(75) Inventors: Zhenghua Fu, Shenzhen (CN); Xiquan Dai, Shenzhen (CN); Yongjing Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/339,080

(22) Filed: Dec. 28, 2011

(65) Prior Publication Data

US 2012/0099183 A1  Apr. 26, 2012

Related U.S. Application Data

(63) Continuation of application No. PCT/CN2010/079100, filed on Nov. 25, 2010.

(30) Foreign Application Priority Data

Nov. 25, 2009  (CN) .......................... 2009 1 0189593

(51) Int. Cl.
*G02F 2/00* (2006.01)

(52) U.S. Cl. ........................................................ 359/325

(58) Field of Classification Search .................... 359/325
See application file for complete search history.

(56) References Cited

U.S. PATENT DOCUMENTS

| 7,145,727 | B2 | 12/2006 | Hsieh |
| 7,411,725 | B2 | 8/2008 | Suzuki et al. |
| 7,489,874 | B2 | 2/2009 | Liu et al. |
| 7,522,343 | B2 | 4/2009 | Hsieh |
| 7,529,490 | B2 | 5/2009 | Hoshida |
| 7,542,149 | B2 * | 6/2009 | Spanner et al. ............... 356/498 |
| 7,573,641 | B2 | 8/2009 | Hsieh |
| 7,668,466 | B2 | 2/2010 | Tian et al. |
| 7,808,715 | B2 | 10/2010 | Hsieh |
| 7,847,952 | B2 | 12/2010 | Suzuki et al. |
| 7,848,662 | B2 * | 12/2010 | Suzuki et al. ................. 398/208 |
| 7,860,394 | B2 | 12/2010 | Hoshida |
| 7,864,430 | B2 | 1/2011 | Hsieh |
| 7,864,433 | B1 | 1/2011 | Hsieh |

(Continued)

FOREIGN PATENT DOCUMENTS

| CN | 2504834 | 8/2002 |
| CN | 1815930 | 8/2006 |

(Continued)

OTHER PUBLICATIONS

Written Opinion of the International Searching Authority, dated (mailed) Mar. 10, 2011; issued in related Application No. PCT/CN2010/079100 for Huawei Tech Co., Ltd.

(Continued)

*Primary Examiner* — Daniel Petkovsek
(74) *Attorney, Agent, or Firm* — Staas & Halsey LLP (57) ABSTRACT

The embodiments of the present invention provides an optical demodulator, which includes a first reflective mirror, a second reflective mirror, a third reflective mirror, and an optical splitter. The optical splitter is configured to: split input light for the first time; split for the second time a first path of light reflected back by the first reflective mirror, where two paths of light obtained by splitting the first path of light are emitted to the first reflective mirror and the third reflective mirror respectively, split for the second time a second path of light reflected back by the second reflective mirror, where two paths of light obtained by splitting the second path of light are emitted to the first reflective mirror and the third reflective mirror respectively.

17 Claims, 3 Drawing Sheets

U.S. PATENT DOCUMENTS

| | | | |
|---|---|---|---|
| 2003/0197870 A1* | 10/2003 | Bagwell et al. | 356/493 |
| 2004/0263990 A1 | 12/2004 | Hsieh | |
| 2006/0171718 A1 | 8/2006 | Hoshida | |
| 2006/0193639 A1 | 8/2006 | Liu et al. | |
| 2006/0268277 A1 | 11/2006 | Hsieh et al. | |
| 2007/0070505 A1 | 3/2007 | Hsieh | |
| 2007/0140695 A1 | 6/2007 | Suzuki et al. | |
| 2007/0223932 A1 | 9/2007 | Hsieh | |
| 2008/0002987 A1 | 1/2008 | Tian et al. | |
| 2008/0218836 A1 | 9/2008 | Suzuki et al. | |
| 2009/0059351 A1* | 3/2009 | Xu et al. | 359/325 |
| 2009/0135473 A1 | 5/2009 | Hsieh | |
| 2009/0213468 A1 | 8/2009 | Hsieh | |
| 2009/0279181 A1 | 11/2009 | Hsieh | |
| 2010/0135677 A1* | 6/2010 | Zaibel et al. | 398/208 |
| 2010/0189437 A1 | 7/2010 | Hoshida | |
| 2011/0170171 A1* | 7/2011 | McCallion et al. | 359/325 |

FOREIGN PATENT DOCUMENTS

| | | |
|---|---|---|
| CN | 1829124 | 9/2006 |
| CN | 201341138 | 11/2009 |
| EP | 1 968 216 | 9/2008 |
| GB | 2 438 061 | 11/2007 |

OTHER PUBLICATIONS

First Chinese Office Action (Partial Translation), dated (mailed) Jan. 30, 2012, issued in related Application No. 200910189593.X.

International Search Report from P.R. China in International Application No. PCT/CN2010/079100, mailed Mar. 10, 2011.

Office Action issued Nov. 2, 2012 in corresponding Chinese Patent Application No. 200910189593.X (6 pages) (7 pages English translation).

Extended European Search Report issued Dec. 12, 2012 in corresponding European Patent Application No. 10832657.0-2415 (7 pages).

* cited by examiner

An optical splitter splits input light for the first time, where a first path of light and a second path of light obtained through the splitting for the first time are emitted to a first reflective mirror and a second reflective mirror respectively

↓

The first reflective mirror reflects the first path of light to the optical splitter, and the second reflective mirror reflects the second path of light to the optical splitter

↓

The optical splitter splits for the second time the first path of light reflected back by the first reflective mirror, where two paths of light obtained by splitting the first path of light are emitted to the first reflective mirror and a third reflective mirror respectively, and splits for the second time the second path of light reflected back by the second reflective mirror, where two paths of light obtained by splitting the second path of light are emitted to the first reflective mirror and the third reflective mirror respectively

↓

The first reflective mirror reflects one of the two paths of light split from the first path of light and the second path of light to the optical splitter, and the third reflective mirror reflects the other of the two paths of light split from the first path of light and the second path of light to the optical splitter

↓

The optical splitter splits two paths of light that are reflected back by the first reflective mirror and the third reflective mirror respectively and obtained by splitting the first path of light, and then makes the split light to interfere with each other, so as to obtain and emit two paths of light with different phases, and splits two paths of light that are reflected back by the first reflective mirror and the third reflective mirror respectively and obtained by splitting the second path of light, and then causes the split light to interfere with each other, so as to obtain and emit two paths of light with different phases

FIG. 5

Optical demodulator

Optical receiver

FIG. 6

OPTICAL DEMODULATOR

CROSS-REFERENCE TO RELATED APPLICATIONS

This application is a continuation of International Application No. PCT/CN2010/079100, filed on Nov. 25, 2010, which claims priority to Chinese Patent Application No. 200910189593.X, filed on Nov. 25, 2009, both of which are hereby incorporated by reference in their entireties.

FIELD OF THE INVENTION

The present invention relates to the field of electronic communications technologies, and in particular, to an optical demodulator.

BACKGROUND OF THE INVENTION

With the continuous increase of optical transmission rate, signal coding technology is updated accordingly. At present, in 40G and 100G optical transmissions, a differential coding technology is mostly used, where it is required that pre-demodulation of a light phase and then optical-electrical conversion is performed at a receiving end to receive a signal. An optical demodulator implements the function of pre-demodulation of a light phase.

Figure 1:
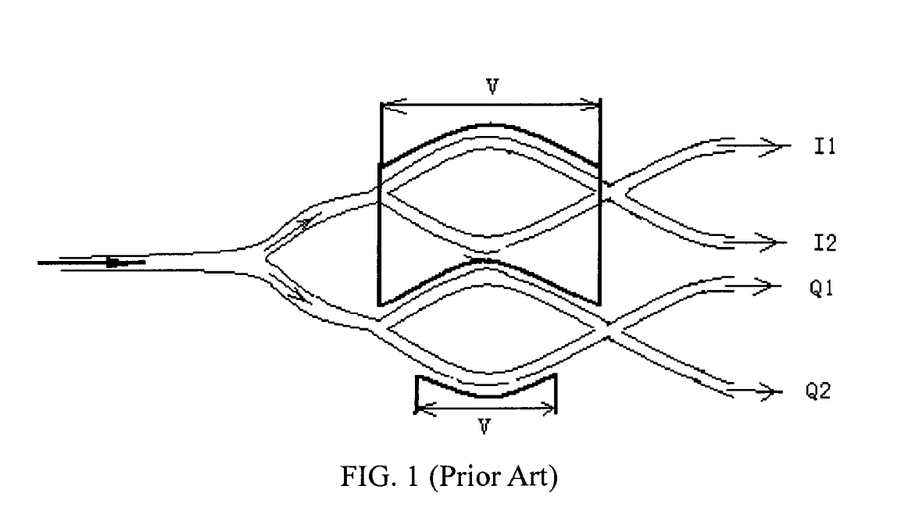
FIG. 1 is a schematic diagram of a conventional optical demodulator.

A current demodulator uses a waveguide technology, where the waveguide technology includes allocating light energy by using waveguide fabrication, and then adjusting one arm, so as to produce interference when two arms are coupled again, thereby implementing a function such as phase separation, as shown in FIG. 1.

The achievement of light splitting and interference by using a method of changing voltage to vary a waveguide refractive index requires a sufficient optical path to meet the requirements of phase adjustment. In this way, the waveguide needs to have a large area, and the demodulator needs to have a large volume accordingly.

SUMMARY OF THE INVENTION

Embodiments of the present invention provide an optical demodulator, where reflective mirrors are disposed at two sides of an optical splitter, and light splitting of many times and interference are achieved in the optical splitter, so as to reduce the volume of the optical demodulator.

In the embodiments of the present invention, the following technical solutions are adopted.

An optical demodulator includes a first reflective mirror, a second reflective mirror, a third reflective mirror, and an optical splitter, where the first reflective mirror is located at one side of the optical splitter, and the second reflective mirror and the third reflective mirror are located at the other side of the optical splitter.

The optical splitter is configured to: split input light for the first time, where a first path of light and a second path of light obtained through the splitting for the first time are emitted to the first reflective mirror and the second reflective mirror respectively; split for the second time the first path of light reflected back by the first reflective mirror, where two paths of light obtained by splitting the first path of light are emitted to the first reflective mirror and the third reflective mirror respectively, and split for the second time the second path of light reflected back by the second reflective mirror, where two paths of light obtained by splitting the second path of light are emitted to the first reflective mirror and the third reflective mirror respectively; and split two paths of light that are reflected back by the first reflective mirror and the third reflective mirror respectively and obtained by splitting the first path of light, and then make the split light to interfere with each other, so as to obtain and emit two paths of light with different phases, and split two paths of light that are reflected back by the first reflective mirror and the third reflective mirror respectively and obtained by splitting the second path of light, and then make the split light to interfere with each other, so as to obtain and emit two paths of light with different phases.

The first reflective mirror is configured to: reflect the first path of light to the optical splitter after the splitting for the first time; reflect one of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases; and reflect one of the two paths of light split from the second path of light to the optical splitter, so that the optical splitter splits the two paths of light obtained by splitting the second path of light, and then makes the split light to interfere with each other, so as to obtain two paths of light with different phases.

The second reflective mirror is configured to reflect the second path of light to the optical splitter after the splitting for the first time.

The third reflective mirror is configured to reflect the other of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases; and reflect the other of the two paths of light split from the second path of light to the optical splitter, so that the optical splitter splits the two paths of light obtained by splitting the second path of light, and then makes the split light to interfere with each other, so as to obtain two paths of light with different phases.

An optical demodulation method includes: splitting, by an optical splitter, input light for the first time, where a first path of light and a second path of light obtained through the splitting for the first time are emitted to a first reflective mirror and a second reflective mirror respectively;

reflecting, by the first reflective mirror, the first path of light to the optical splitter, and reflecting, by the second reflective mirror, the second path of light to the optical splitter;

splitting, by the optical splitter for the second time, the first path of light reflected back by the first reflective mirror, where two paths of light obtained by splitting the first path of light are emitted to the first reflective mirror and a third reflective mirror respectively, and splitting for the second time the second path of light reflected back by the second reflective mirror, where two paths of light obtained by splitting the second path of light are emitted to the first reflective mirror and the third reflective mirror respectively;

reflecting, by the first reflective mirror, one of the two paths of light that are split from the first path of light and the second path of light to the optical splitter, and reflecting, by the third reflective mirror, the other of the two paths of light that are split from the first path of light and the second path of light to the optical splitter; and splitting, by the optical splitter, two paths of light that are reflected back by the first reflective mirror and the third reflective mirror respectively and obtained by splitting the first path of light, and then making the split light to interfere with each other, so as to obtain and emit two paths of light with different phases, and splitting two paths of light that are reflected back by the first reflective mirror and the third reflective mirror respectively and obtained by splitting the second path of light, and then making the split light to interfere with each other, so as to obtain and emit two paths of light with different phases.

A communication device includes an optical receiver and an optical demodulator. The optical demodulator includes a first reflective mirror, a second reflective mirror, a third reflective mirror, and an optical splitter. The first reflective mirror is located at one side of the optical splitter, and the second reflective mirror and the third reflective mirror are located at the other side of the optical splitter. The optical splitter is configured to: split input light for the first time, where a first path of light and a second path of light obtained through the splitting for the first time are emitted to the first reflective mirror and the second reflective mirror respectively; split for the second time the first path of light reflected back by the first reflective mirror, where two paths of light obtained by splitting the first path of light are emitted to the first reflective mirror and the third reflective mirror respectively, and split for the second time the second path of light reflected back by the second reflective mirror, where two paths of light obtained by splitting the second path of light are emitted to the first reflective mirror and the third reflective mirror respectively; and split two paths of light that are reflected back by the first reflective mirror and the third reflective mirror respectively and obtained by splitting the first path of light, and then make the split light to interfere with each other, so as to obtain and emit two paths of light with different phases, and split two paths of light that are reflected back by the first reflective mirror and the third reflective mirror respectively and obtained by splitting the second path of light, and then make the split light to interfere with each other, so as to obtain and emit two paths of light with different phases. The first reflective mirror is configured to reflect the first path of light to the optical splitter after the splitting for the first time, reflect one of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases, and reflect one of the two paths of light split from the second path of light to the optical splitter, so that the optical splitter splits the two paths of light obtained by splitting the second path of light, and then makes the split light to interfere with each other, so as to obtain two paths of light with different phases. The second reflective mirror is configured to reflect the second path of light to the optical splitter after the splitting for the first time. The third reflective mirror is configured to reflect the other of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases, and reflect the other of the two paths of light split from the second path of light to the optical splitter, so that the optical splitter splits the two paths of light obtained by splitting the second path of light, and then makes the split light to interfere with each other, so as to obtain two paths of light with different phases.

The optical receiver is configured to convert an optical signal demodulated by the optical demodulator into an electrical signal.

In the embodiments of the present invention, the reflective mirrors are disposed at two sides of the optical splitter, and light splitting of many times and interference are achieved in the optical splitter located between the reflective mirrors, so that the volume of the optical demodulator is relatively small.

BRIEF DESCRIPTION OF THE DRAWINGS

To illustrate the technical solutions in embodiments of the present invention or in the prior art clearer, accompanying drawings for describing the embodiments of the present invention or the prior art are outlined below. Apparently, the accompanying drawings are only some embodiments of the present invention, and persons of ordinary skill in the art may derive other drawings according to these accompanying drawings without creative efforts.

FIG. 5 is a schematic diagram of an embodiment of an optical demodulation method according to the present invention; and FIG. 6 is a schematic diagram of an embodiment of a communication device according to the present invention.

DETAILED DESCRIPTION OF THE EMBODIMENTS

The technical solutions in the embodiments of the present invention will be clearly and fully described in the following with reference to the accompanying drawings. It is obvious that the embodiments to be described are only a part rather than all of the embodiments of the present invention. All other embodiments that are obtained by persons of ordinary skill in the art based on the embodiments of the present invention without creative efforts shall fall within the protection scope of the present invention.

Figure 2:
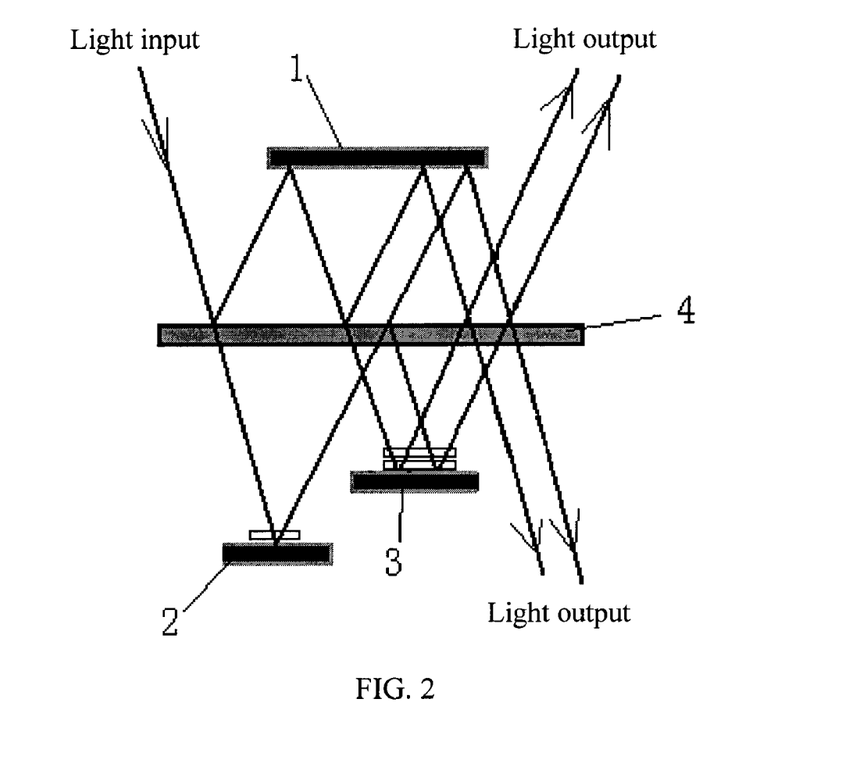
FIG. 2 is a schematic diagram of an embodiment of an optical demodulator according to the present invention.

As shown in FIG. 2, an embodiment of the present invention provides an optical demodulator, which includes a first reflective mirror 1, a second reflective mirror 2, a third reflective mirror 3, and an optical splitter 4, where the first reflective mirror 1 is located at one side of the optical splitter 4, and the second reflective mirror 2 and the third reflective mirror 3 are located at the other side of the optical splitter 4.

The optical splitter 4 is configured to: split input light for the first time, where a first path of light and a second path of light obtained through the splitting for the first time are emitted to the first reflective mirror 1 and the second reflective mirror 2 respectively; split for the second time the first path of light reflected back by the first reflective mirror 1, where two paths of light obtained by splitting the first path of light are emitted to the first reflective mirror 1 and the third reflective mirror 3 respectively, and split for the second time the second path of light reflected back by the second reflective mirror 2, where two paths of light obtained by splitting the second path of light are emitted to the first reflective mirror 1 and the third reflective mirror 3 respectively; and split two paths of light that are reflected back by the first reflective mirror 1 and the third reflective mirror 3 respectively and obtained by splitting the first path of light, and then make the split light to interfere with each other, so as to obtain and emit two paths of light with different phases, and split two paths of light that are reflected back by the first reflective mirror 1 and the third reflective mirror 3 respectively and obtained by splitting the second path of light, and then make the split light to interfere with each other, so as to obtain and emit two paths of light with different phases.

The first reflective mirror 1 is configured to: reflect the first path of light to the optical splitter after the splitting for the first time; reflect one of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases; and reflect one of the two paths of light split from the second path of light to the optical splitter, so that the optical splitter splits the two paths of light obtained by splitting the second path of light, and then makes the split light to interfere with each other, so as to obtain two paths of light with different phases.

The second reflective mirror 2 is configured to reflect the second path of light to the optical splitter after the splitting for the first time.

The third reflective mirror 3 is configured to reflect the other of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases, and reflect the other of the two paths of light split from the second path of light to the optical splitter, so that the optical splitter splits the two paths of light obtained by splitting the second path of light, and then makes the split light to interfere with each other, so as to obtain two paths of light with different phases.

In the embodiment of the present invention, the reflective mirrors are disposed at two sides of the optical splitter, and by using a space optical coupling (Freespace) technology, light splitting of many times is achieved in the optical splitter located between the reflective mirrors, and after the two paths of light split from the first path of light are further split into four paths of light, two paths of light in the same direction interfere with each other and then are combined into one path of light, and the process is similar for the second path of light, which achieves phase separation of the light, and fulfils the purpose of optical demodulation. As the reflective mirrors are disposed at two sides of the optical splitter, and light splitting of many times and interference are achieved in the optical splitter located between the reflective mirrors, the volume of the optical demodulator is relatively small.

Further, in the optical demodulator according to the embodiment of the present invention, the first path of light and the second path of light may be reflected back by the first reflective mirror and the second reflective mirror respectively to positions close to each other on the optical splitter, by adjusting an incident angle of the input light, a distance between the first reflective mirror and the optical splitter, and a distance between the second reflective mirror and the optical splitter. Therefore, a distance between emitted light of the optical demodulator is small, which is convenient for the integration of the optical demodulator and a subsequent optical receiver.

In the embodiment of the optical demodulator, the light inputted to the optical demodulator may be incident on the optical splitter from the side of the first reflective mirror 1 (see FIG. 2), or incident on the optical splitter from the side of the second reflective mirror 2 and the third reflective mirror 3.

In the embodiment of the present invention, the optical demodulator may further include an optical path adjusting element, which is configured to adjust an optical path. The optical path adjusting element may be a silicon chip, or liquid crystal.

Figure 3:
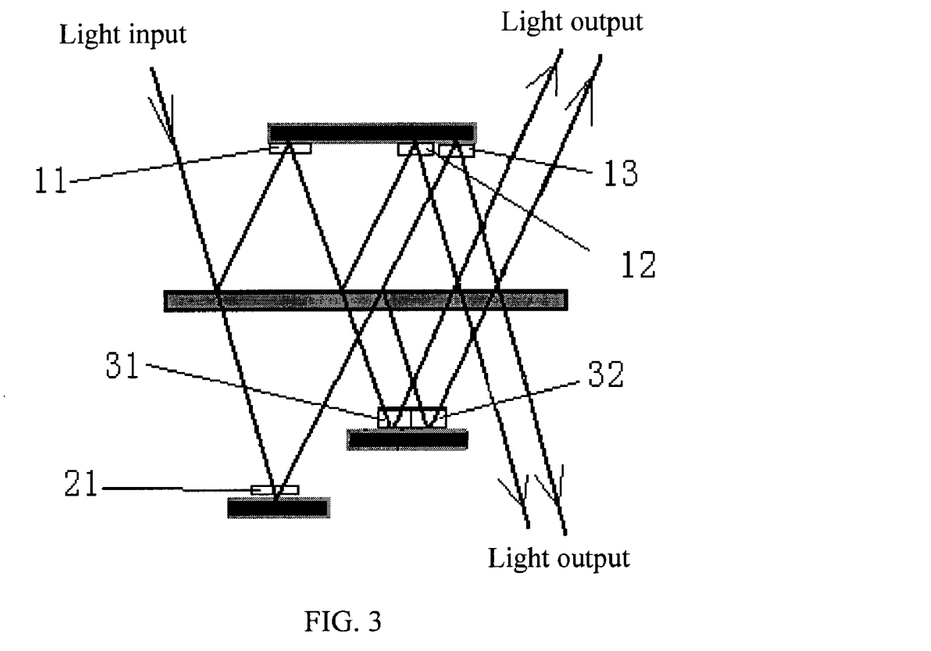
FIG. 3 is a schematic diagram of optical path adjusting elements in the embodiment of the optical demodulator according to the present invention.

As shown in FIG. 3, an A1 optical path adjusting element 11 may be disposed on or in front of a mirror face of the first reflective mirror.

The A1 optical path adjusting element 11 is configured to adjust an optical path of the first path of light, so that a position to which the first path of light is reflected on the optical splitter is different from a position to which the second path of light is reflected on the optical splitter, and optical paths, which the first path of light and the second path of light emitted after the splitting for the first time take from leaving the optical splitter to returning to the optical splitter from the first reflective mirror and the second reflective mirror, are equal.

As shown in FIG. 3, a B optical path adjusting element 21 may be disposed on or in front of a mirror face of the second reflective mirror.

The B optical path adjusting element 21 is configured to adjust an optical path of the second path of light, so that a position to which the second path of light is reflected on the optical splitter is different from a position to which the first path of light is reflected on the optical splitter, and optical paths, which the first path of light and the second path of light emitted after the splitting for the first time take from leaving the optical splitter to returning to the optical splitter from the first reflective mirror and the second reflective mirror, are equal.

As shown in FIG. 3, a C1 optical path adjusting element 31 may be disposed on or in front of a mirror face of the third reflective mirror.

The C1 optical path adjusting element 31 is configured to adjust an optical path of a path of light that is one of the two paths of light split from the first path of light and is emitted to the third reflective mirror, so that the two paths of light obtained by splitting the first path of light are split and then interfere with each other in the same position on the optical splitter, and a difference between optical paths, which the two paths of light emitted from the first path of light after the splitting for the second time take from leaving the optical splitter to returning to the optical splitter from the first reflective mirror and the third reflective mirror, is a predetermined optical path difference, where the predetermined optical path difference enables the two paths of light split from the first path of light to be further split and then interfere with each other, and achieves corresponding decoding of a differentially coded signal, so as to achieve optical demodulation.

A C2 optical path adjusting element 32 may also be disposed on or in front of the mirror face of the third reflective mirror.

The C2 optical path adjusting element 32 is configured to adjust an optical path of a path of light that is one of the two paths of light split from the second path of light and is emitted to the third reflective mirror, so that the two paths of light obtained by splitting the second path of light are split and then interfere with each other in the same position on the optical splitter, and a difference between optical paths, which the two paths of light emitted from the second path of light after the splitting for the second time take from leaving the optical splitter to returning to the optical splitter from the first reflective mirror and the third reflective mirror, is a predetermined optical path difference, where the predetermined optical path difference enables the two paths of light split from the second path of light to be further split and then interfere with each other, and achieves corresponding decoding of a differentially coded signal, so as to achieve optical demodulation.

Figure 4:
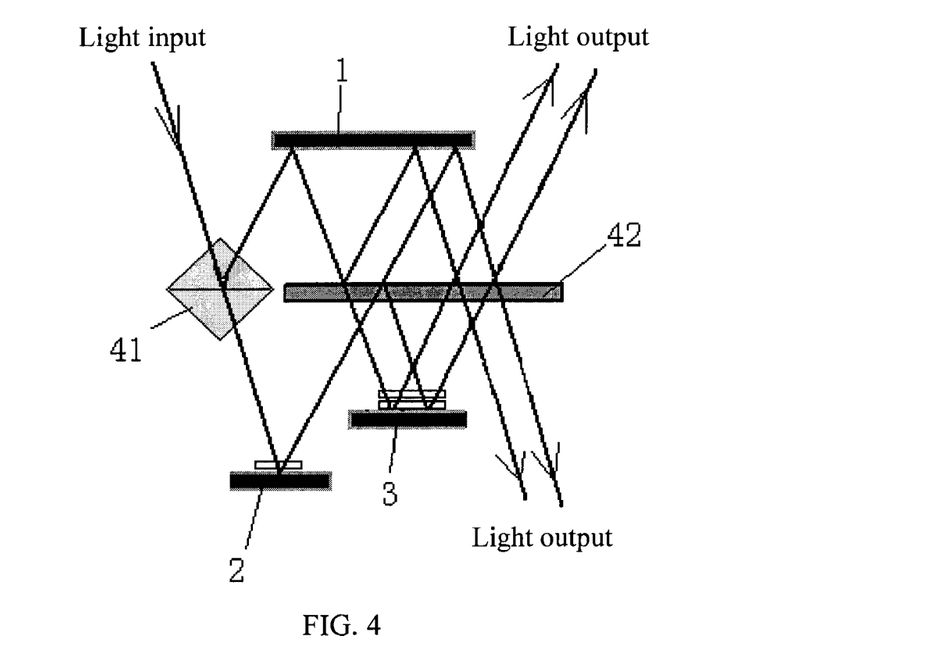
FIG. 4 is a schematic diagram of an embodiment of another optical demodulator according to the present invention.

As shown in FIG. 4, an A2 optical path adjusting element 12 may be disposed on or in front of the mirror face of the first reflective mirror.

The A2 optical path adjusting element 12 is configured to adjust an optical path of a path of light that is one of the two paths of light split from the first path of light and is emitted to the first reflective mirror, so that the two paths of light obtained by splitting the first path of light are split and then interfere with each other in the same position on the optical splitter, and a difference between optical paths, which the two paths of light emitted from the first path of light after the splitting for the second time take from leaving the optical splitter to returning to the optical splitter from the first reflective mirror and the third reflective mirror, is a predetermined optical path difference, where the predetermined optical path difference enables the two paths of light split from the first path of light to be further split and then interfere with each other, and achieves corresponding decoding of a differentially coded signal, so as to achieve optical demodulation.

As shown in FIG. 5, an A3 optical path adjusting element 13 may be disposed on or in front of the mirror face of the first reflective mirror.

The A3 optical path adjusting element 13 is configured to adjust an optical path of a path of light that is one of the two paths of light split from the second path of light and is emitted to the first reflective mirror, so that the two paths of light obtained by splitting the second path of light are split and then interfere with each other in the same position on the optical splitter, and a difference between optical paths, which the two paths of light emitted from the second path of light after the splitting for the second time take from leaving the optical splitter to returning to the optical splitter from the first reflective mirror and the third reflective mirror, is a predetermined optical path difference, where the predetermined optical path difference enables the two paths of light split from the second path of light to be further split and then interfere with each other, and achieves corresponding decoding of a differentially coded signal, so as to achieve optical demodulation.

In the embodiment of the present invention, on the first reflective mirror, only the A1 optical path adjusting element, the A2 optical path adjusting element, or the A3 optical path adjusting element may be disposed; or any two of the three optical path adjusting elements may be disposed; or even all the three optical path adjusting elements A1 to A3 may be disposed. When any two or all of the optical path adjusting elements A1 to A3 are disposed, the optical path adjusting elements may be separate or integrated.

On the third reflective mirror, only the C1 optical path adjusting element or the C2 optical path adjusting element may be disposed, or both the C1 and C2 optical path adjusting elements may be disposed. When both the C1 and C2 optical path adjusting elements are disposed, the optical path adjusting elements may be disposed separately or integrated.

In the embodiment of the present invention, the optical path adjusting element is disposed, so that the optical path is changed, and the light is split in a suitable position and generates a suitable optical path difference, thereby achieving optical demodulation.

Further, the A1, A2, A3, B1, C1, or C2 optical path adjusting element may be made of a material having an electro-optical or thermo-optical property, where their refractive indices may be changed by heating or applying a voltage. When a frequency of light inputted to the optical demodulator is changed, the phase of the light may be changed by heating or applying a voltage to the A1, A2, A3, B1, C1, or C2 optical path adjusting element, so that the optical demodulator may be adapted to light of different frequencies.

As shown in FIG. 2 or 3, in the embodiment of the present invention, the two paths of light after the splitting for the second time are split after returning to the optical splitter from the first and the third reflective mirrors respectively, and among the split four paths of light, two paths of light impinging on the side of the first reflective mirror interfere with each other, and two paths of light impinging on the side of the third reflective mirror interfere with each other. In order to achieve interference, the directions of the two paths of light interfering with each other must be consistent, which may be achieved by adjusting an angle of the first reflective mirror or the third reflective mirror.

In the embodiment of the present invention, the first reflective mirror physically may be one reflective mirror, so that the splitting and interference of three paths of light (the first path of light, and the two paths of light that are split from the first path of light and the second path of light respectively) may be controlled at the same time when the first reflective mirror is adjusted, which improves the adjustment efficiency. However, the first reflective mirror physically may also be three reflective mirrors, and the three reflective mirrors respectively adjust and control the splitting and interference of the three paths of light (the first path of light, and the two paths of light that are split from the first path of light and the second path of light respectively), so that the adjustment is more flexible. In addition, the first reflective mirror physically may also be two reflective mirrors, and one of the two reflective mirrors adjusts one or two of the three paths of light (the first path of light, and the two paths of light that are split from the first path of light and the second path of light respectively), and the other reflective mirror adjusts the rest paths of light, so as to have both the foregoing advantages.

The third reflective mirror physically may be one reflective mirror, so that the splitting and interference of two paths of light (the two paths of light that are split from the first path of light and the second path of light respectively) may be controlled at the same time when the third reflective mirror is adjusted, which improves the adjustment efficiency. However, the third reflective mirror may be physically two reflective mirrors, and the two reflective mirrors respectively adjust and control the splitting and interference of the two paths of light (the two paths of light that are split from the first path of light and the second path of light respectively), so that the adjustment is more flexible.

As shown in FIG. 2, in the embodiment of the present invention, the optical splitter may be physically one element. For example, the optical splitter may be a coated glass plate or other light-transmitting crystal plates. If the optical splitter physically is one element, the components of the optical demodulator may be decreased, so that the optical demodulator has a simple structure.

In addition, as shown in FIG. 4, the optical splitter may further include two physically separate units: a first optical splitting unit 41 and a second optical splitting unit 42.

The first optical splitting unit 41 is configured to split the input light for the first time, where the first path of light and the second path of light obtained through the splitting for the first time are emitted to the first reflective mirror and the second reflective mirror respectively.

The second optical splitting unit 42 is configured to: split for the second time the first path of light reflected back by the first reflective mirror, where the two paths of light obtained by splitting the first path of light are emitted to the first reflective mirror and the third reflective mirror respectively, and split for the second time the second path of light reflected back by the second reflective mirror, where the two paths of light obtained through the splitting for the second time are emitted to the first reflective mirror and the third reflective mirror respectively; and split the two paths of light that are reflected back by the first reflective mirror and the third reflective mirror respectively and obtained by splitting the first path of light, and then make the split light to interfere with each other, so as to obtain and emit two paths of light with different phases, and split the two paths of light that are reflected back by the first reflective mirror and the third reflective mirror respectively and obtained by splitting the second path of light, and then make the split light to interfere with each other, so as to obtain and emit two paths of light with different phases.

The first optical splitting unit may be coated glass or other light-transmitting crystal.

The second optical splitting unit may be a coated glass plate or other light-transmitting crystal plates.

As shown in FIG. 5, an embodiment of the present invention further provides an optical demodulation method, which includes:

splitting, by an optical splitter, input light for the first time, where a first path of light and a second path of light obtained through the splitting for the first time are emitted to a first reflective mirror and a second reflective mirror respectively;

reflecting, by the first reflective mirror, the first path of light to the optical splitter, and reflecting, by the second reflective mirror, the second path of light to the optical splitter;

splitting, by the optical splitter for the second time, the first path of light reflected back by the first reflective mirror, where two paths of light obtained by splitting the first path of light are emitted to the first reflective mirror and a third reflective mirror respectively, and splitting for the second time the second path of light reflected back by the second reflective mirror, where two paths of light obtained by splitting the second path of light are emitted to the first reflective mirror and the third reflective mirror respectively;

reflecting, by the first reflective mirror, one of the two paths of light that are split from the first path of light and the second path of light to the optical splitter, and reflecting, by the third reflective mirror, the other of the two paths of light that are split from the first path of light and the second path of light to the optical splitter; and splitting, by the optical splitter, two paths of light that are reflected back by the first reflective mirror and the third reflective mirror respectively and obtained by splitting the first path of light, and then making the split light to interfere with each other, so as to obtain and emit two paths of light with different phases, and splitting two paths of light that are reflected back by the first reflective mirror and the third reflective mirror respectively and obtained by splitting the second path of light, and then making the split light to interfere with each other, so as to obtain and emit two paths of light with different phases.

Persons of ordinary skill in the art can understand that, all or part of processes in the method according to the embodiments may be accomplished by a computer program instructing relevant hardware. The program may be stored in a computer-readable storage medium. When the program is executed, the processes of the method according to the embodiments of the present invention are performed. The storage medium may be a magnetic disk, an optical disk, a read-only memory (ROM), or a random access memory (RAM).

As shown in FIG. 6, an embodiment of the present invention further provides a communication device, where the communication device includes:

an optical demodulator, configured to demodulate an optical signal; and an optical receiver, configured to convert the optical signal demodulated by the optical demodulator into an electrical signal.

The optical demodulator may be the optical demodulator in the foregoing embodiments, and is not further introduced herein.

The communication device may be an optical transceiver module.

The optical transceiver module is configured to implement optical-electrical signal conversion, optical signal modulation, and optical signal demodulation.

The optical transceiver may be a differential 10G optical transceiver module, a differential 40G optical transceiver module, or a differential 100G optical transceiver module.

What are described above are merely several embodiments of the present invention. Persons skilled in the art may make various modifications or variations to the present invention according to the disclosure of the application documents without departing from the spirit and scope of the present invention.

What is claimed is:

1. An optical demodulator, comprising a first reflective mirror, a second reflective mirror, a third reflective mirror, and an optical splitter, wherein the first reflective mirror is located at one side of the optical splitter, and the second reflective mirror and the third reflective mirror are located at the other side of the optical splitter, and the first, second and third reflective mirrors are separated from the optical splitter;

wherein the optical splitter is configured to: split input light for a first time, wherein a first path of light and a second path of light obtained through the splitting for the first time are emitted to the first reflective mirror and the second reflective mirror respectively; split for a second time the first path of light reflected back by the first reflective mirror, wherein two paths of light obtained by splitting the first path of light are emitted to the first reflective mirror and the third reflective mirror respectively, and split for the second time the second path of light reflected back by the second reflective mirror, wherein two paths of light obtained by splitting the second path of light are emitted to the first reflective mirror and the third reflective mirror respectively; and split two paths of light that are reflected back by the first reflective mirror and the third reflective mirror respectively and obtained by splitting the first path of light, and then make the split light to interfere with each other, so as to obtain and emit two paths of light with different phases, and split two paths of light that are reflected back by the first reflective mirror and the third reflective mirror respectively and obtained by splitting the second path of light, and then make the split light to interfere with each other, so as to obtain and emit two paths of light with different phases;

wherein the first reflective mirror is configured to: reflect the first path of light to the optical splitter after the splitting for the first time; reflect one of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases; and reflect one of the two paths of light split from the second path of light to the optical splitter, so that the optical splitter splits the two paths of light obtained by splitting the second path of light, and then makes the split light to interfere with each other, so as to obtain two paths of light with different phases;

wherein the second reflective mirror is configured to reflect the second path of light to the optical splitter after the splitting for the first time; and wherein the third reflective mirror is configured to: reflect the other of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases; and reflect the other of the two paths of light split from the second path of light to the optical splitter, so that the optical splitter splits the two paths of light obtained by splitting the second path of light, and then makes the split light to interfere with each other, so as to obtain two paths of light with different phases wherein positions of reflections of the first path of light and the second path of light reflected back by the first reflective mirror and the second reflective mirror respectively are adjustable with respect to each other on the optical splitter, by adjustability of an incident angle of the input light, a distance between the first reflective mirror and the optical splitter, and a distance between the second reflective mirror and the optical splitter.

2. The optical demodulator according to claim 1, wherein a first optical path adjusting element is disposed on or in front of a mirror face of the first reflective mirror; and wherein the first optical path adjusting element is configured to adjust an optical path of the first path of light, so that a position to which the first path of light is reflected on the optical splitter is different from a position to which the second path of light is reflected on the optical splitter, and optical paths, which the first path of light and the second path of light emitted after the splitting for the first time take from leaving the optical splitter to returning to the optical splitter from the first reflective mirror and the second reflective mirror, are equal.

3. The optical demodulator according to claim 1, wherein a fourth optical path adjusting element is disposed on or in front of a mirror face of the second reflective mirror; and wherein the fourth optical path adjusting element is configured to adjust an optical path of the second path of light, so that a position to which the second path of light is reflected on the optical splitter is different from a position to which the first path of light is reflected on the optical splitter, and optical paths, which the first path of light and the second path of light emitted after the splitting for the first time take from leaving the optical splitter to returning to the optical splitter from the first reflective mirror and the second reflective mirror, are equal.

4. The optical demodulator according to claim 1, wherein a fifth optical path adjusting element is disposed on or in front of a mirror face of the third reflective mirror; and wherein the fifth optical path adjusting element is configured to adjust an optical path of a path of light that is one of the two paths of light split from the first path of light and is emitted to the third reflective mirror, so that the two paths of light obtained by splitting the first path of light are split and then interfere with each other in the same position on the optical splitter, and a difference between optical paths, which the two paths of light emitted from the first path of light after the splitting for the second time take from leaving the optical splitter to returning to the optical splitter from the first reflective mirror and the third reflective mirror, is a predetermined optical path difference, wherein the predetermined optical path difference enables the two paths of light split from the first path of light to be further split and then interfere with each other, and achieves corresponding decoding of a differentially coded signal, so as to achieve optical demodulation.

5. The optical demodulator according to claim 1, wherein a sixth optical path adjusting element is disposed on or in front of a mirror face of the third reflective mirror; and wherein the sixth optical path adjusting element is configured to adjust an optical path of a path of light that is one of the two paths of light split from the second path of light and is emitted to the third reflective mirror, so that the two paths of light obtained by splitting the second path of light are split and then interfere with each other in the same position on the optical splitter, and a difference between optical paths, which the two paths of light emitted from the second path of light after the splitting for the second time take from leaving the optical splitter to returning to the optical splitter from the first reflective mirror and the third reflective mirror, is a predetermined optical path difference, wherein the predetermined optical path difference enables the two paths of light split from the second path of light to be further split and then interfere with each other, and achieves corresponding decoding of a differentially coded signal, so as to achieve optical demodulation.

6. The optical demodulator according to claim 1, wherein a second optical path adjusting element is disposed on or in front of a mirror face of the first reflective mirror; and wherein the second optical path adjusting element is configured to adjust an optical path of a path of light that is one of the two paths of light split from the first path of light and is emitted to the first reflective mirror, so that the two paths of light obtained by splitting the first path of light are split and then interfere with each other in the same position on the optical splitter, and a difference between optical paths, which the two paths of light emitted from the first path of light after the splitting for the second time take from leaving the optical splitter to returning to the optical splitter from the first reflective mirror and the third reflective mirror, is a predetermined optical path difference, wherein the predetermined optical path difference enables the two paths of light split from the first path of light to be further split and then interfere with each other, and achieves corresponding decoding of a differentially coded signal, so as to achieve optical demodulation.

7. The optical demodulator according to claim 1, wherein a third optical path adjusting element is disposed on or in front of a mirror face of the first reflective mirror; and wherein the third optical path adjusting element is configured to adjust an optical path of a path of light that is one of the two paths of light split from the second path of light and is emitted to the first reflective mirror, so that the two paths of light obtained by splitting the second path of light are split and then interfere with each other in the same position on the optical splitter, and a difference between optical paths, which the two paths of light emitted from the second path of light after the splitting for the second time take from leaving the optical splitter to returning to the optical splitter from the first reflective mirror and the third reflective mirror, is a predetermined optical path difference, wherein the predetermined optical path difference enables the two paths of light split from the second path of light to be further split and then interfere with each other, and achieves corresponding decoding of a differentially coded signal, so as to achieve optical demodulation.

8. The optical demodulator according to claim 1, wherein the optical splitter comprises two physically separate units: a first optical splitting unit and a second optical splitting unit;
wherein the first optical splitting unit is configured to split the input light for the first time, wherein the first path of light and the second path of light obtained through the splitting for the first time are emitted to the first reflective mirror and the second reflective mirror respectively; and
wherein the second optical splitting unit is configured to split for the second time the first path of light reflected back by the first reflective mirror, wherein the two paths of light obtained by splitting the first path of light are emitted to the first reflective mirror and the third reflective mirror respectively; split for the second time the second path of light reflected back by the second reflective mirror, wherein the two paths of light obtained through the splitting for the second time are emitted to the first reflective mirror and the third reflective mirror respectively; and split the two paths of light that are reflected back by the first reflective mirror and the third reflective mirror respectively and obtained by splitting the first path of light, and then make the split light to interfere with each other, so as to obtain and emit two paths of light with different phases, and split the two paths of light reflected back by the first reflective mirror and the third reflective mirror respectively and obtained by splitting the second path of light, and then make the split light to interfere with each other, so as to obtain and emit two paths of light with different phases.

9. An optical demodulation method, comprising: splitting, by an optical splitter, input light for a first time, wherein a first path of light and a second path of light obtained through the splitting for the first time are emitted to a first reflective mirror and a second reflective mirror respectively;
reflecting, by the first reflective mirror, the first path of light to the optical splitter, and reflecting, by the second reflective mirror, the second path of light to the optical splitter;
splitting, by the optical splitter for a second time, the first path of light reflected back by the first reflective mirror, wherein two paths of light obtained by splitting the first path of light are emitted to the first reflective mirror and a third reflective mirror respectively, and splitting for the second time the second path of light reflected back by the second reflective mirror, wherein two paths of light obtained by splitting the second path of light are emitted to the first reflective mirror and the third reflective mirror respectively;
reflecting, by the first reflective mirror, one of the two paths of light that are split from the first path of light and the second path of light to the optical splitter, and reflecting, by the third reflective mirror, the other of the two paths of light that are split from the first path of light and the second path of light to the optical splitter; and splitting, by the optical splitter, two paths of light that are reflected back by the first reflective mirror and the third reflective mirror respectively and obtained by splitting the first path of light, and then making the split light to interfere with each other, so as to obtain and emit two paths of light with different phases, and splitting two paths of light reflected back by the first reflective mirror and the third reflective mirror respectively and obtained by splitting the second path of light, and then making the split light to interfere with each other, so as to obtain and emit two paths of light with different phases, wherein, the first, second and third reflective mirrors are separated from the optical splitter, and positions of reflections of the first path of light and the second path of light reflected back by the first reflective mirror and the second reflective mirror respectively are adjustable with respect to each other on the optical splitter, by adjustment of an incident angle of the input light, a distance between the first reflective mirror and the optical splitter, and a distance between the second reflective mirror and the optical splitter.

10. A communication device, comprising an optical receiver and a optical demodulator, wherein:
the optical demodulator, comprises a first reflective mirror, a second reflective mirror, a third reflective mirror, and an optical splitter, wherein the first reflective mirror is located at one side of the optical splitter, and the second reflective mirror and the third reflective mirror are located at the other side of the optical splitter, and the first, second and third reflective mirrors are separated from the optical splitter;
the optical splitter is configured to: split input light for a first time, wherein a first path of light and a second path of light obtained through the splitting for the first time are emitted to the first reflective mirror and the second reflective mirror respectively; split for a second time the first path of light reflected back by the first reflective mirror, wherein two paths of light obtained by splitting the first path of light are emitted to the first reflective mirror and the third reflective mirror respectively, and split for the second time the second path of light reflected back by the second reflective mirror, wherein two paths of light obtained by splitting the second path of light are emitted to the first reflective mirror and the third reflective mirror respectively; and split two paths of light that are reflected back by the first reflective mirror and the third reflective mirror respectively and obtained by splitting the first path of light, and then make the split light to interfere with each other, so as to obtain and emit two paths of light with different phases, and split two paths of light that are reflected back by the first reflective mirror and the third reflective mirror respectively and obtained by splitting the second path of light, and then make the split light to interfere with each other, so as to obtain and emit two paths of light with different phases;
the first reflective mirror is configured to: reflect the first path of light to the optical splitter after the splitting for the first time; reflect one of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases; and reflect one of the two paths of light split from the second path of light to the optical splitter, so that the optical splitter splits the two paths of light obtained by splitting the second path of light, and then makes the split light to interfere with each other, so as to obtain two paths of light with different phases;
the second reflective mirror is configured to reflect the second path of light to the optical splitter after the splitting for the first time;
the third reflective mirror is configured to: reflect the other of the two paths of light split from the first path of light to the optical splitter after the splitting for the second time, so that the optical splitter splits the two paths of light obtained by splitting the first path of light, and then makes the split light to interfere with each other, so as to obtain two paths of light with different phases; and reflect the other of the two paths of light split from the second path of light to the optical splitter, so that the optical splitter splits the two paths of light obtained by splitting the second path of light, and then makes the split light to interfere with each other, so as to obtain two paths of light with different phases; and the optical receiver is configured to convert an optical signal demodulated by the optical demodulator into an electrical signal, wherein positions of reflections of the first path of light and the second path of light reflected back by the first reflective mirror and the second reflective mirror respectively are adjustable with respect to each other on the optical splitter, by adjustability of an incident angle of the input light, a distance between the first reflective mirror and the optical splitter, and a distance between the second reflective mirror and the optical splitter.

11. The communication device according to claim 10, wherein a first optical path adjusting element is disposed on or in front of a mirror face of the first reflective mirror; and wherein the first optical path adjusting element is configured to adjust an optical path of the first path of light, so that a position to which the first path of light is reflected on the optical splitter is different from a position to which the second path of light is reflected on the optical splitter, and optical paths, which the first path of light and the second path of light emitted after the splitting for the first time take from leaving the optical splitter to returning to the optical splitter from the first reflective mirror and the second reflective mirror, are equal.

12. The communication device according to claim 10, wherein a fourth optical path adjusting element is disposed on or in front of a mirror face of the second reflective mirror; and wherein the fourth optical path adjusting element is configured to adjust an optical path of the second path of light, so that a position to which the second path of light is reflected on the optical splitter is different from a position to which the first path of light is reflected on the optical splitter, and optical paths, which the first path of light and the second path of light emitted after the splitting for the first time take from leaving the optical splitter to returning to the optical splitter from the first reflective mirror and the second reflective mirror, are equal.

13. The communication device according to claim 10, wherein a fifth optical path adjusting element is disposed on or in front of a mirror face of the third reflective mirror; and wherein the fifth optical path adjusting element is configured to adjust an optical path of a path of light that is one of the two paths of light split from the first path of light and is emitted to the third reflective mirror, so that the two paths of light obtained by splitting the first path of light are split and then interfere with each other in the same position on the optical splitter, and a difference between optical paths, which the two paths of light emitted from the first path of light after the splitting for the second time take from leaving the optical splitter to returning to the optical splitter from the first reflective mirror and the third reflective mirror, is a predetermined optical path difference, wherein the predetermined optical path difference enables the two paths of light split from the first path of light to be further split and then interfere with each other, and achieves corresponding decoding of a differentially coded signal, so as to achieve optical demodulation.

14. The communication device according to claim 10, wherein a sixth optical path adjusting element is disposed on or in front of a mirror face of the third reflective mirror; and wherein the sixth optical path adjusting element is configured to adjust an optical path of a path of light that is one of the two paths of light split from the second path of light and is emitted to the third reflective mirror, so that the two paths of light obtained by splitting the second path of light are split and then interfere with each other in the same position on the optical splitter, and a difference between optical paths, which the two paths of light emitted from the second path of light after the splitting for the second time take from leaving the optical splitter to returning to the optical splitter from the first reflective mirror and the third reflective mirror, is a predetermined optical path difference, wherein the predetermined optical path difference enables the two paths of light split from the second path of light to be further split and then interfere with each other, and achieves corresponding decoding of a differentially coded signal, so as to achieve optical demodulation.

15. The communication device according to claim 10, wherein a second optical path adjusting element is disposed on or in front of a mirror face of the first reflective mirror; and wherein the second optical path adjusting element is configured to adjust an optical path of a path of light that is one of the two paths of light split from the first path of light and is emitted to the first reflective mirror, so that the two paths of light obtained by splitting the first path of light are split and then interfere with each other in the same position on the optical splitter, and a difference between optical paths, which the two paths of light emitted from the first path of light after the splitting for the second time take from leaving the optical splitter to returning to the optical splitter from the first reflective mirror and the third reflective mirror, is a predetermined optical path difference, wherein the predetermined optical path difference enables the two paths of light split from the first path of light to be further split and then interfere with each other, and achieves corresponding decoding of a differentially coded signal, so as to achieve optical demodulation.

16. The communication device according to claim 10, wherein an third optical path adjusting element is disposed on or in front of a mirror face of the first reflective mirror; and wherein the third optical path adjusting element is configured to adjust an optical path of a path of light that is one of the two paths of light split from the second path of light and is emitted to the first reflective mirror, so that the two paths of light obtained by splitting the second path of light are split and then interfere with each other in the same position on the optical splitter, and a difference between optical paths, which the two paths of light emitted from the second path of light after the splitting for the second time take from leaving the optical splitter to returning to the optical splitter from the first reflective mirror and the third reflective mirror, is a predetermined optical path difference, wherein the predetermined optical path difference enables the two paths of light split from the second path of light to be further split and then interfere with each other, and achieves corresponding decoding of a differentially coded signal, so as to achieve optical demodulation.

17. The communication device according to claim 10, wherein the optical splitter comprises two physically separate units: a first optical splitting unit and a second optical splitting unit;

wherein the first optical splitting unit is configured to split the input light for the first time, wherein the first path of light and the second path of light obtained through the splitting for the first time are emitted to the first reflective mirror and the second reflective mirror respectively; and wherein the second optical splitting unit is configured to split for the second time the first path of light reflected back by the first reflective mirror, wherein the two paths of light obtained by splitting the first path of light are emitted to the first reflective mirror and the third reflective mirror respectively; split for the second time the second path of light reflected back by the second reflective mirror, wherein the two paths of light obtained through the splitting for the second time are emitted to the first reflective mirror and the third reflective mirror respectively; and split the two paths of light that are reflected back by the first reflective mirror and the third reflective mirror respectively and obtained by splitting the first path of light, and then make the split light to interfere with each other, so as to obtain and emit two paths of light with different phases, and split the two paths of light reflected back by the first reflective mirror and the third reflective mirror respectively and obtained by splitting the second path of light, and then make the split light to interfere with each other, so as to obtain and emit two paths of light with different phases.

\* \* \* \* \*